(12) United States Patent
Valencia Villalobos

(10) Patent No.: US 12,357,132 B2
(45) Date of Patent: Jul. 15, 2025

(54) SYSTEM AND METHOD FOR DISPENSING TALCUM POWDER AND DRYING OF FEET

(71) Applicant: Luis Eduardo Valencia Villalobos, Quilpue (CL)

(72) Inventor: Luis Eduardo Valencia Villalobos, Quilpue (CL)

( * ) Notice: Subject to any disclaimer, the term of this patent is extended or adjusted under 35 U.S.C. 154(b) by 785 days.

(21) Appl. No.: 17/511,970

(22) Filed: Oct. 27, 2021

(65) Prior Publication Data

US 2022/0133102 A1 May 5, 2022

(30) Foreign Application Priority Data

Nov. 2, 2020 (CL) .................................. 202002837

(51) Int. Cl.
*A47K 10/48* (2006.01)
*G01F 11/00* (2006.01)

(52) U.S. Cl.
CPC ............ *A47K 10/48* (2013.01); *G01F 11/003* (2013.01)

(58) Field of Classification Search
CPC .............................. G01F 11/003; A47K 10/48
See application file for complete search history.

(56) References Cited

U.S. PATENT DOCUMENTS

| 3,130,726 | A | * | 4/1964 | Elm | A61M 35/20 604/293 |
| 3,378,009 | A | * | 4/1968 | Peplin | A61M 35/00 604/293 |
| 3,683,896 | A | * | 8/1972 | Peplin | A61H 23/02 604/289 |
| 3,986,643 | A | * | 10/1976 | Chutter | B65D 83/06 222/195 |
| 4,029,096 | A | * | 6/1977 | Fust | A61M 35/00 604/293 |
| 4,077,546 | A | * | 3/1978 | Winkelried | A61H 35/006 222/179 |
| 4,878,602 | A | * | 11/1989 | Weigelt | A61M 35/00 222/196 |
| 5,157,850 | A | * | 10/1992 | Terng-Shuh | F26B 9/003 392/379 |
| 5,438,764 | A | * | 8/1995 | Reppas | A47K 10/48 34/90 |
| 5,491,908 | A | * | 2/1996 | Ruiz | A47K 10/48 34/91 |
| 6,189,231 | B1 | * | 2/2001 | Lancer | A47K 10/48 34/90 |
| 6,393,717 | B1 | * | 5/2002 | Santos | A47K 10/48 34/232 |

(Continued)

*Primary Examiner* — Thien S Tran
(74) *Attorney, Agent, or Firm* — Mehdi Zamanpour

(57) ABSTRACT

An apparatus and a method to cover the need for drying and care of feet, that aims to have a dryer that includes an electric motor that drives the air together with a resistance that provides heat for optimal drying and in the shortest possible time. In turn, it has a concave section in the lower part of the device that deflects the air blown to the lower part of the feet. Similarly, it contains a foot powder dispenser that provides the precise amount of foot powder, and that at the bottom there is a compact fabric that removes excess water from the feet a padded fabric that helps disperse the powder on the feet, allowing the covering of all areas of the fingers. All its parameters can be modified manually or automatically.

20 Claims, 13 Drawing Sheets

(56) References Cited

U.S. PATENT DOCUMENTS

| | | | | |
|---|---|---|---|---|
| 6,705,023 B1* | 3/2004 | Hoover | ............... | A47K 10/48 |
| | | | | 392/382 |
| 7,278,225 B1* | 10/2007 | Espinosa | ............... | A47K 10/48 |
| | | | | 34/233 |
| 7,480,950 B2* | 1/2009 | Feher | ............... | A47C 7/74 |
| | | | | 5/423 |
| 8,065,814 B2* | 11/2011 | Olvera | ............... | A47K 10/48 |
| | | | | 34/232 |
| 9,775,474 B2* | 10/2017 | Holguin | ............... | A61B 5/004 |
| 2002/0189125 A1* | 12/2002 | Lancer | ............... | A47K 10/48 |
| | | | | 34/96 |
| 2002/0194746 A1* | 12/2002 | Lancer | ............... | A47K 10/48 |
| | | | | 34/90 |
| 2007/0267020 A1* | 11/2007 | Harris | ............... | A61H 23/00 |
| | | | | 128/205.24 |
| 2009/0022485 A1* | 1/2009 | Madden | ............... | A47K 10/48 |
| | | | | 392/382 |
| 2010/0193709 A1* | 8/2010 | Dalton | ............... | A61L 2/10 |
| | | | | 250/504 R |
| 2011/0296704 A1* | 12/2011 | Jefferson | ............... | F26B 5/16 |
| | | | | 34/90 |
| 2016/0100720 A1* | 4/2016 | Holguin | ............... | A47K 10/48 |
| | | | | 34/90 |
| 2016/0169553 A1* | 6/2016 | Wilder | ............... | F24H 3/0417 |
| | | | | 392/380 |
| 2023/0329967 A1* | 10/2023 | Sharma | ............... | A61L 2/0088 |

* cited by examiner

SYSTEM AND METHOD FOR DISPENSING TALCUM POWDER AND DRYING OF FEET

FIELD OF THE INVENTION

The relates to a method and apparatus for drying feet while delivering talc while to an exact amount to distribute throughout the foot and applying a recommended temperature for total foot drying, to assemble the talc dosing equipment and its use. More specifically, the present invention refers to an apparatus with a talc dosing system and drying feet for domestic use, which is made up of; system column, air ducts, base, doser, dryer motor, electric heater, main casing, container, lid, main base, drying base, manual switch, manual parameter change switches, video cameras and sensors.

BACKGROUND OF THE INVENTION

Sweating is a normal biological process and is usually temporary. For example, in different stages of life in which the body undergoes changes, such as in early ages (7 to 10 years) or in puberty, due to hormonal development, sweating can be excessive and with a bad smell. With its more than 250,000 sweat glands, it is common for our feet, in certain situations, to suffer from a bad smell. Currently it is very widespread that this pathology is associated with a lack of podiatric hygiene, but in reality, there are many other factors that cause this anomaly.

Bad odor is produced when sweat comes into contact with the bacteria that we all have on our skin, producing ammonia and fatty acid in its decomposition. Scientifically this condition is known as Bromhidrosis, which is defined as excessive sweating (hyperhidrosis).

Removing moisture from the feet, especially between the toes, can help prevent the fungus from spreading and getting worse. People can remove moisture from their feet by drying them thoroughly with a hair dryer after bathing, making sure no moisture remains, but being careful not to burn the skin. However, those with mobility problems or reduced mobility will not be able to carry out this action, which increases the risk of fungal formation.

On the other hand, in most cases, the use of the bath towel to dry the feet is very frequent, so stopping and taking care of drying the feet will depend a lot on the type of material used (yarn, lycra, among others) and the time that each individual wishes to implement for the task, likewise, the application of foot powder must, until today, be 100% manual, since there is no system that doses the talcum powder with the exact amount you want, both to cover the dorsal and lower area of the feet.

The invention, to which this document refers, seeks to cover this need for drying and caring for the feet. As is well known, having dry feet and a product (foot powder) together is essential for caring for them. In the same way, this device ensures that the best conditions for the feet are maintained, thus helping the proper daily use of some type of shoe or slipper.

Currently, foot powder is the most important product for foot care. Talc is used to absorb moisture from the feet and prevent perspiration from them, most of the powders with which these talc's are made, have components that allow it to retain moisture and combat perspiration, prevent bad odor produced by the formation of fungi.

According to the above, there is a need for a dispenser to improve the aforementioned drawbacks, which aims to make and implement a type of dryer that includes an electric motor that drives the air, in conjunction with a resistance, which provides the heat for an optimal drying and in the shortest possible time. In turn, it contemplates a concave section in the lower part of the device in order to divert the blown air to the lower part of the feet, thus achieving 360 degrees drying.

SUMMARY OF THE INVENTION

The dryer includes an electric motor that drives the air together with a resistance that provides heat for optimal drying and in the shortest possible time through ducts. In turn, it has a concave section in the lower part of the device that deflects the blown air to the lower part of the feet.

The talc dispenser, which provides the precise and homogeneous amount to avoid wasting it and spreading.

A container that stores foot powder

Two sections of fabric, one to remove excess water from the feet and the other more padded so that the powder reaches the bottom of the feet.

A column and a base that support all the systems.

In addition, the device consists of a switch with 3 positions, the first "off" position, the second "dryer" position and the third "dose talc" position.

For the automatic version, the device includes a sensor that activates drying and dosing.

To be able to modify the operating parameters, be it drying times, power of the blown air, air temperature and amount of talc, the appliance has 4 switches.

A camera that shows the feet to the user.

It should be emphasized that the dryer cannot work at the same time as the talc dispenser, because activating the drying and dispenser at the same time will generate a talc cloud.

The device works with household electrical current.

DETAILED DESCRIPTION OF THE INVENTION

The invention mainly corresponds to a device that doses talc and dries the feet to keep the feet free of moisture, combat fungi and prevent bad odor in shoes and slippers.

When the appliance works with electric current, the plug must be connected to a socket where it will be used.

Figure 1:
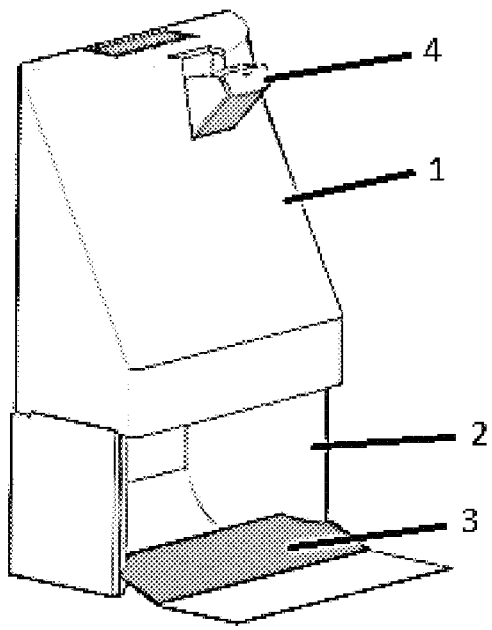
FIG. 1 shows the apparatus as a whole.
Figure 2:
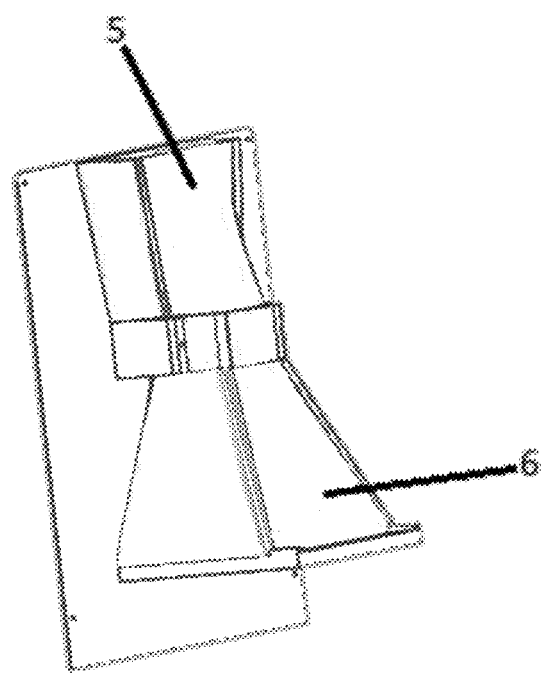
FIG. 2 shows the column of the apparatus together with the dryer support, the air inlet and outlet ducts.
Figure 3:
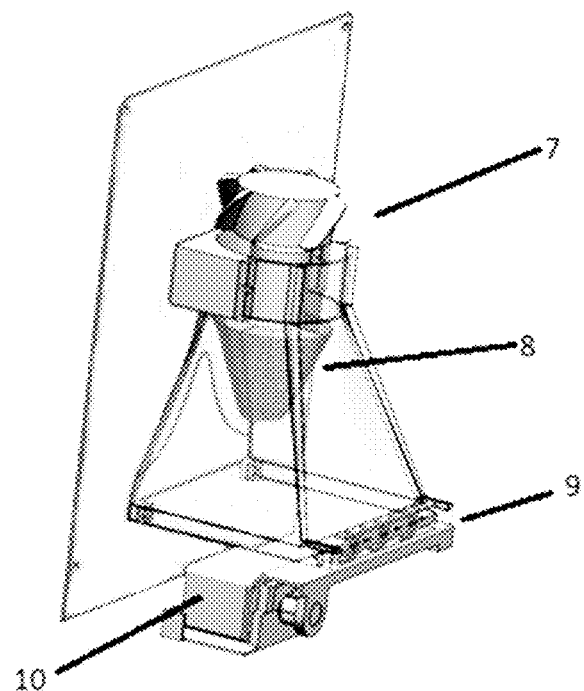
FIG. 3 shows the dryer and the talc dispenser as a whole.
Figure 4:
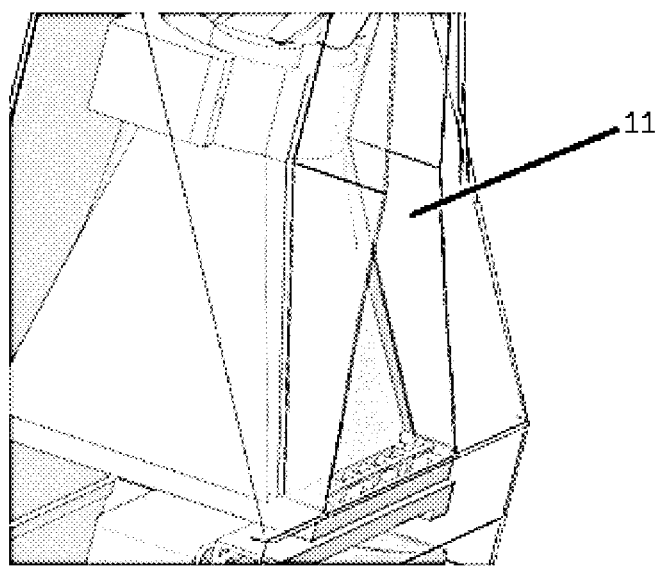
FIG. 4 shows the container where the talc is stored.
Figure 5:
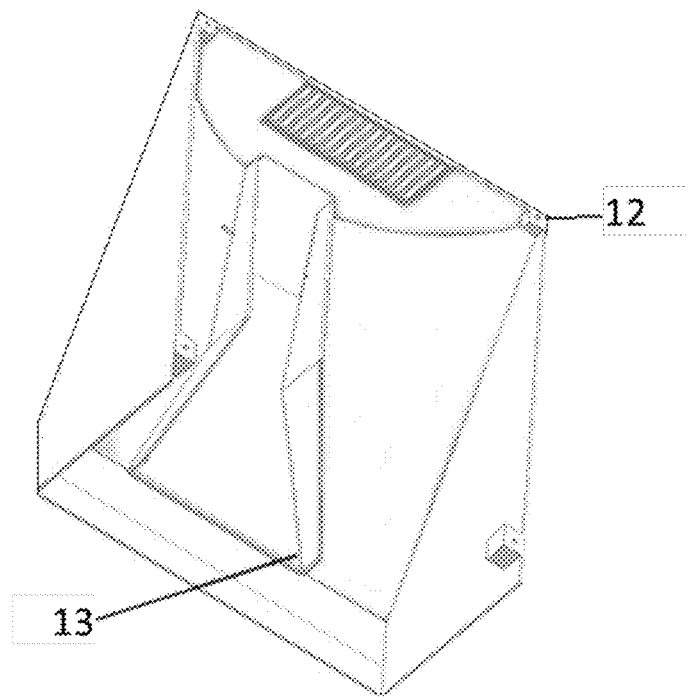
FIG. 5 shows the interior section of the casing.
Figure 6:
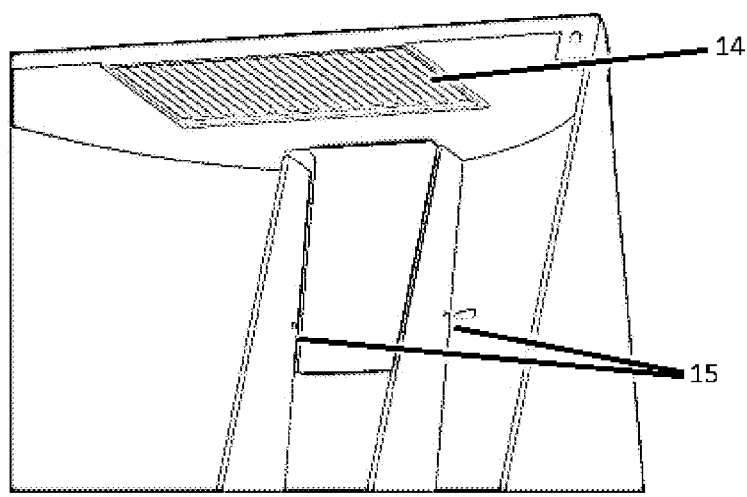
FIG. 6 shows the upper inner section of the casing.
Figure 7:
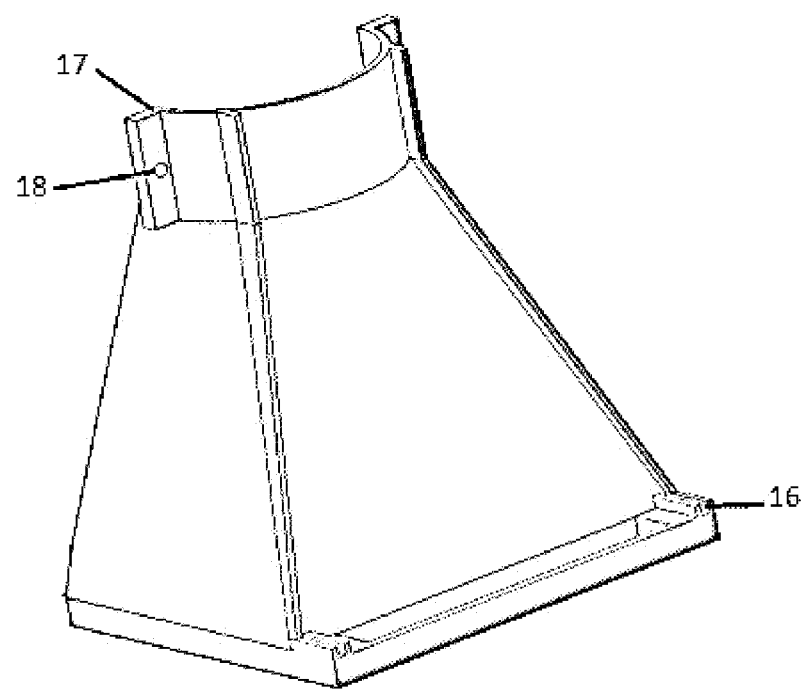
FIG. 7 shows the air outlet duct, dryer bracket and base.
Figure 8:
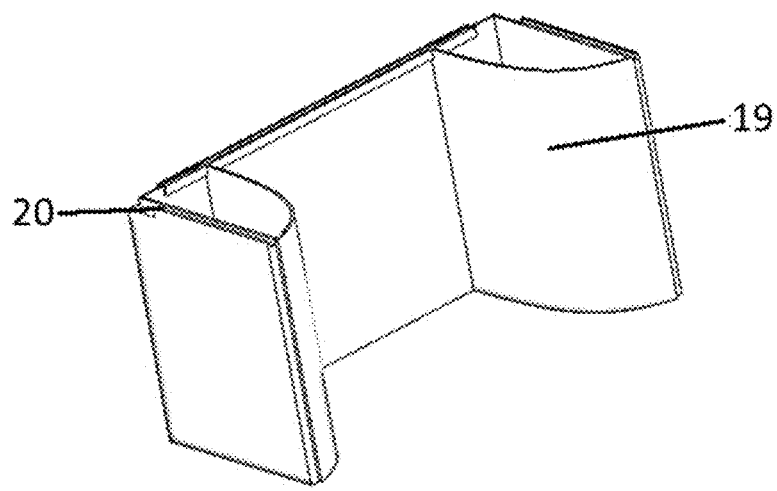
FIG. 8 shows the main base.
Figure 9:
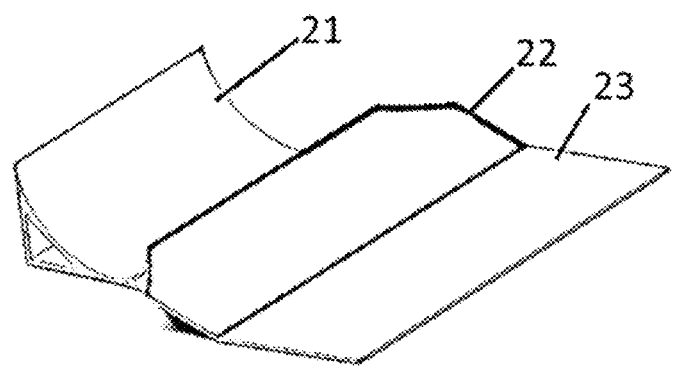
FIG. 9 shows the drying base.
Figure 10:
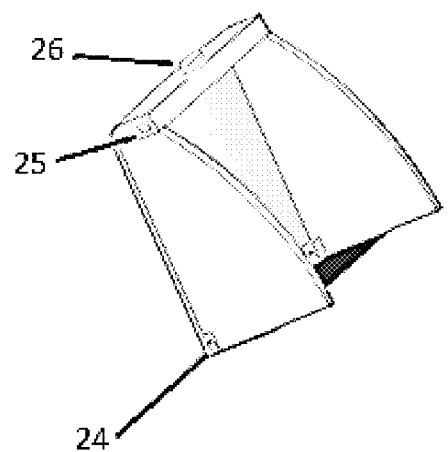
FIG. 10 shows the lid of the container.
Figure 11:
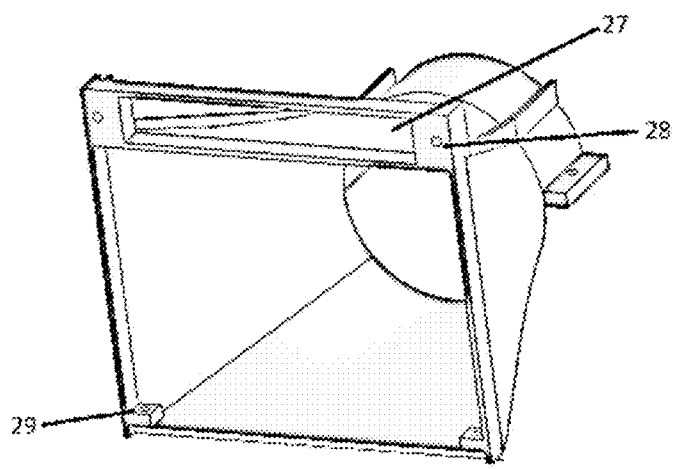
FIG. 11 shows the lower section of the air outlet duct, its talc passage section and fasteners.
Figure 12:
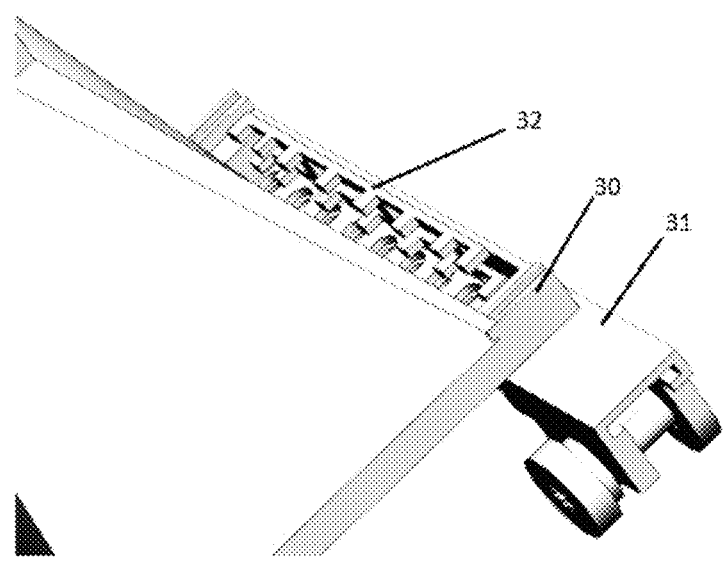
FIG. 12 shows the dosing system as a whole.
Figure 13:
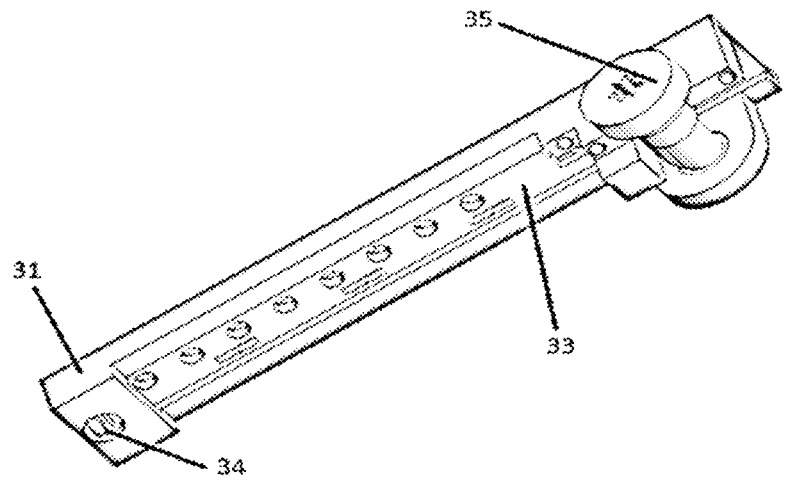
FIG. 13 shows the dosing system from a bottom view.
Figure 14:
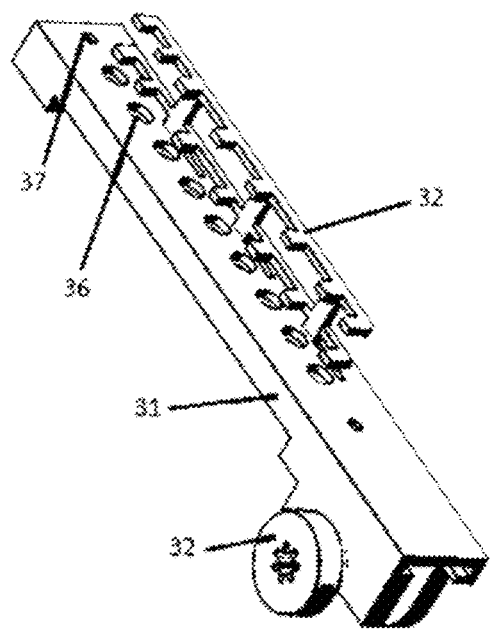
FIG. 14 shows the dosing system from a top view.
Figure 15:
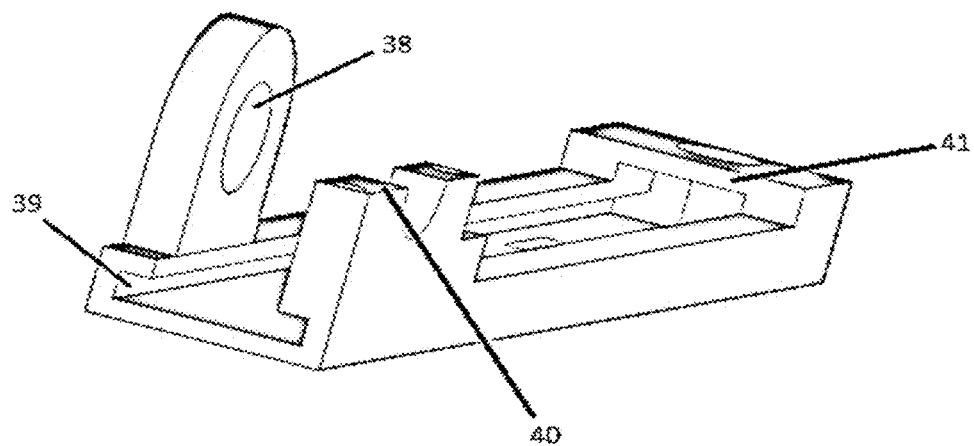
FIG. 15 shows the main structure of the dispenser.
Figure 16:
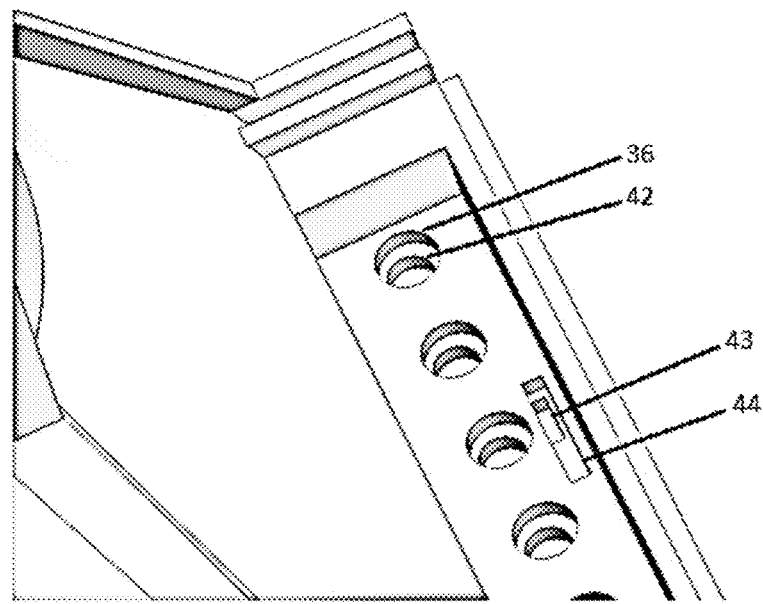
FIG. 16 shows the dosing section of the dosing system.
Figure 17:
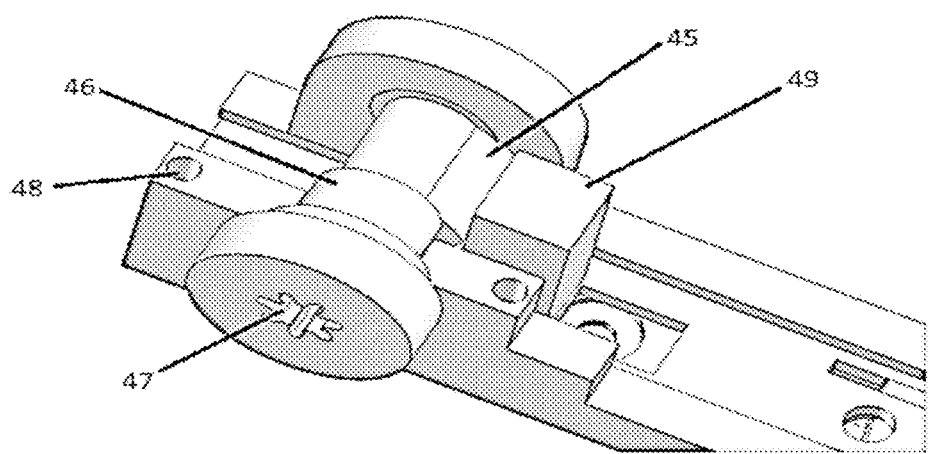
FIG. 17 shows the cam shaft in its operating section.
Figure 18:
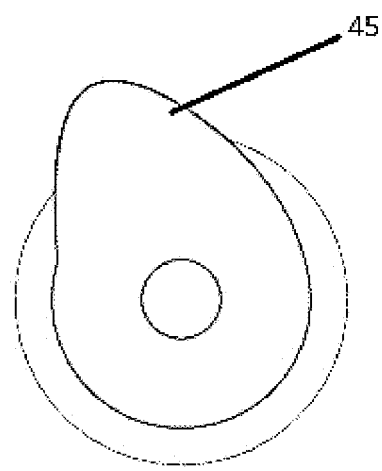
FIG. 18 shows the cam shaft in its lateral section.
Figure 19:
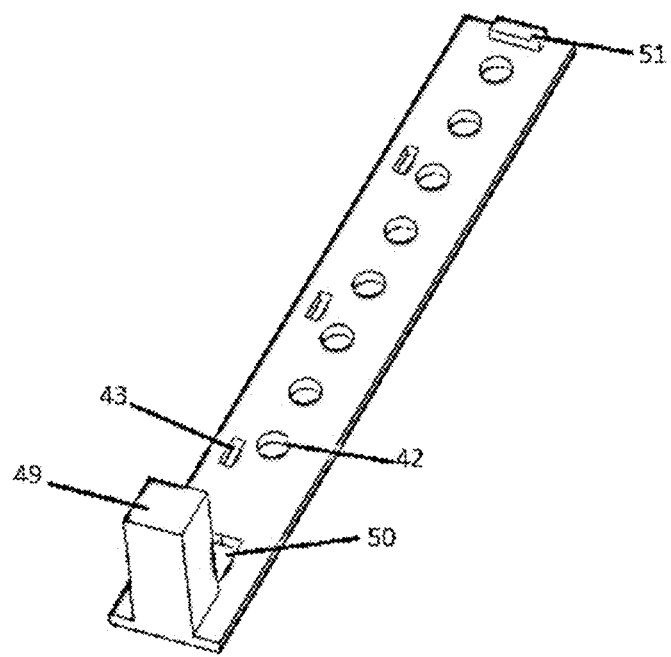
FIG. 19 shows the dosing plate.
Figure 20:
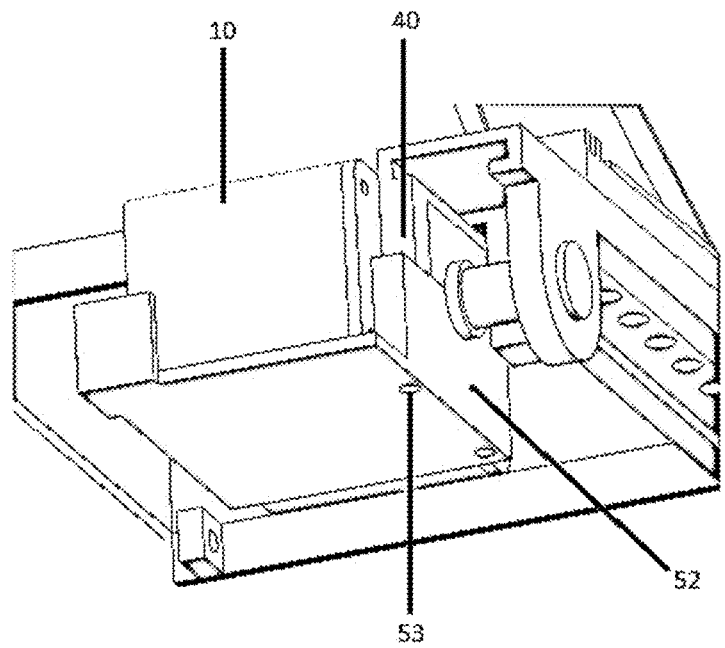
FIG. 20 the section of the dispenser motor.
Figure 21:
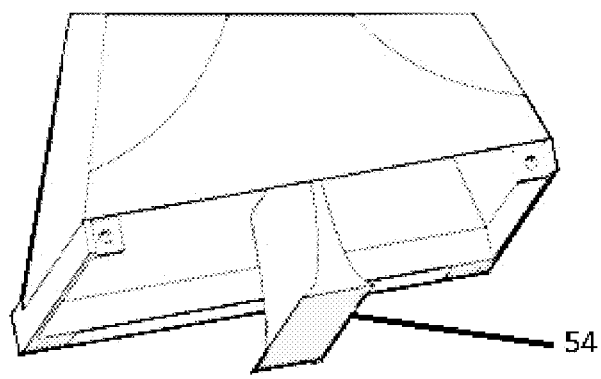
FIG. 21 shows the section that separates the air for the 2-foot use.
Figure 22:
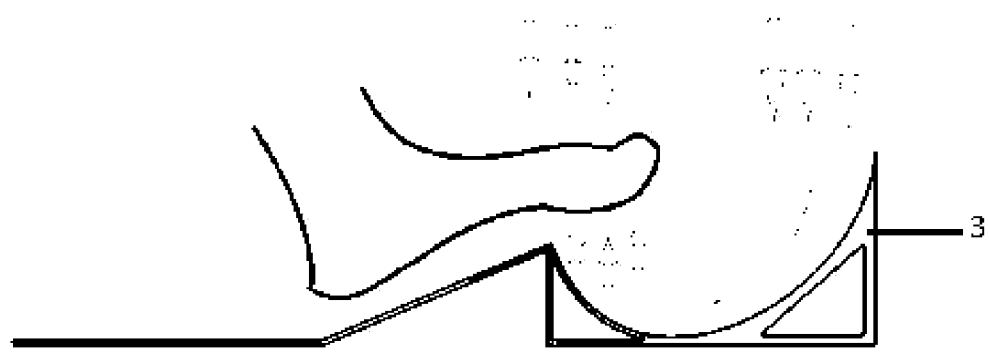
FIG. 22 shows the air flow in the drying base.
Figure 23:
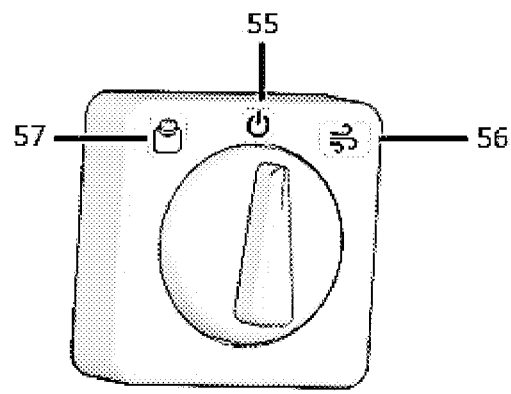
FIG. 23 shows the manual switch to operate the appliance.
Figure 24:
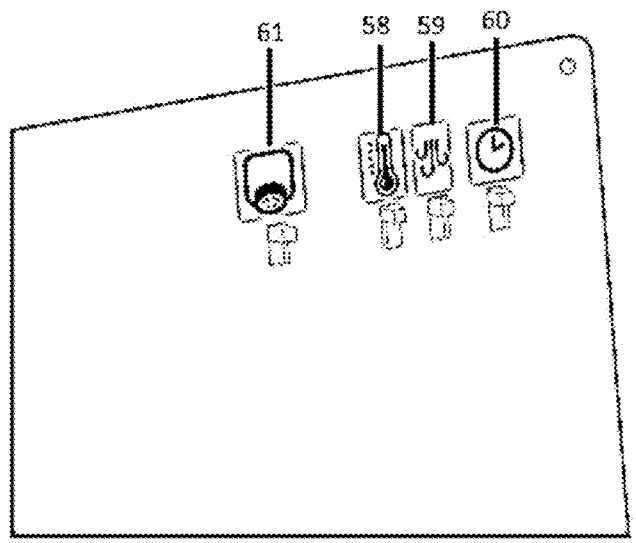
FIG. 24 shows the switches for changing the parameters.
Figure 25:
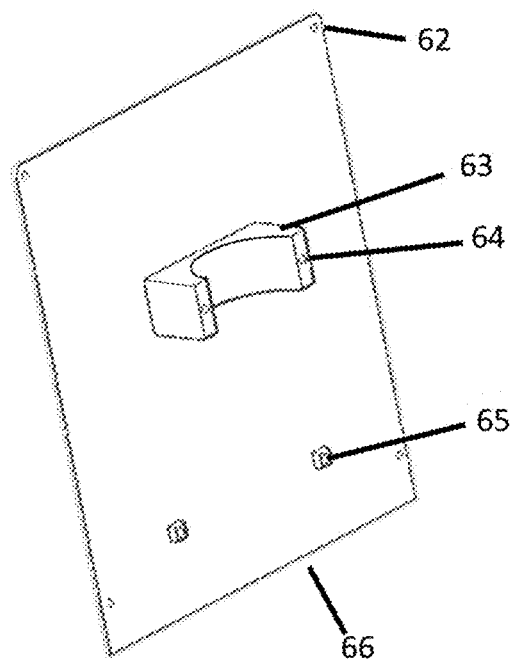
FIG. 25 shows the column of the apparatus.
Figure 26:
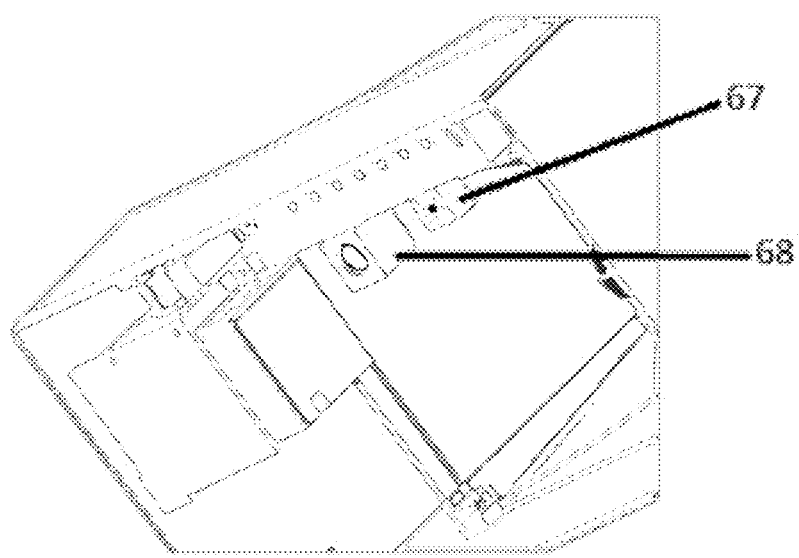
FIG. 26 shows the camera and sensor.

The device as a whole works in 2 phases, the first in drying the feet and the second in the dosage of talc in them. For this, the operation of this part by operating the switch from the off position (55) to the drying position (56) causes the electric drying motor (7) to rotate its 6 to 8 blades, sucking the air through of the casing (1) that has slits (14) and passes through the inlet duct (5). Then the air is driven through electric resistances (8) which heats the air to dry the feet, this is in the outlet duct (6), where it passes to the feet to be dried. In the drying base (3) there is a concave section (21) which a part of the air deflects it to reach the lower parts of the feet. Obtaining optimal drying in the shortest possible time FIG. 22 shows how it works.

To turn off the dryer, return the switch to the off position (55). After the feet are dry, the switch is activated to the dosing position (57), it drives an electric motor (10) that rotates from 100 to 400 rpm and makes the talc dispenser (9) work through a cam shaft (35) that has an ovoid shape (45) with a diameter greater than 9.16 mm, its smaller diameter is 2.94 mm, which moves a plate (33) at one of its ends a rectangular section (49) with a movement rectilinear which is pushed at its other end to a rectangular flange (51) by a spring (34), this creates a constant cycle until the switch stops operating. The plate moves back and forth through a rail (39), causing that, at a certain point of its movement, the 4.5 mm dosing holes (42) intersect with the holes in the frame (36) 6 mm, giving room for the talc to pass through. This difference in hole measurements is what makes it deliver the precise amount of talc per cycle.

By itself, talc tends to bunch up, so there is a toothed structure (32) which is positioned on the plate (33) in the rectangular holes (43). This moves through slits of the main structure (44) so that it has the same rectilinear movement of the plate (33) and thus be able to move the talc. The upper teeth of the toothed structure (32) move the plug to the rectangular opening (27) of the base (30) and the lower teeth help the talc to go down through the holes in the structure (36) and the holes dosing (42). The talc is dosed on the feet and a part on the spongy fabric (22) to then gently hit this fabric with the lower part of the feet and thus obtain an optimal spread between the fingers and lower part of the feet. The compact fabric (23) removes excess water from the feet before drying them.

To do this, the talc must first be incorporated through a lid (4) into the container (11), this has a capacity of 100 grams to 5,000 grams. This lid (4) functions as a funnel and is fastened to the casing (1) through the fixing holes of the casing (15) and the holes of the lid (24). It opens and closes through a flange (26) and when closed it maintains its position through protrusions (25) that press against the casing (1). The container (11) is formed between the outlet duct (6), the casing (1) and the base (30), through the casing walls (13) that match the coupling walls (16), creating space to store the talc. The talc passes through the rectangular opening (27) of the base (30), reaching the talc dispenser (9).

The talc dispenser (9) is held on the base (30) through the holes in the base (28) and these in turn are joined by the fastening holes (37) of the main structure (31). The main structure (31) has a hole in the space (41) and the plate (33) has an opening (50) so that the screws that fix the main structure (31) to the base (30) can pass. The space (41) also serves as the positioning of the spring (34). The cam shaft (35) rests on its shaft (46), on the closed bearing (38) and on the open bearing (40) to be able to rotate. The open support (40) is in the middle since the only way to place the cam shaft (35) in that place. The open support (40) has the connection holes (48) in which it is fixed by the motor base (52) by the holes of the motor base (53). The cam shaft (35) has at its end a grooved female section (47) through which the electric motor (10) is connected.

The talc dispenser (9) is held on the base (30) through the holes in the base (28) and these in turn are joined by the fastening holes (37) of the main structure (31). The main structure (31) has a hole in the space (41) and the plate (33) has an opening (50) so that the screws that fix the main structure (31) to the base (30) can pass. The space (41) also serves as the positioning of the spring (34). The cam shaft (35) rests on its shaft (46), on the closed bearing (38) and on the open bearing (40) to be able to rotate. The open support (40) is in the middle since the only way to place the cam shaft (35) in that place. The open support (40) has the connection holes (48) in which it is fixed by the motor base (52) by the holes of the motor base (53). The cam shaft (35) has at its end a grooved female section (47) through which the electric motor (10) is connected.

The housing (1) is supported through the holes in the housing (12) and holes in the column (62). The support of the column (63) supports the electric resistances (8) and the electric drying motor (7) with the support of the duct (17) through the fixing holes (18) and the fixing holes of the column (64). The outlet duct (6) is also fixed to the column (66) through the lower holes of the duct (29) and the lower holes of the column (65).

The main base (2) has some support shims (20) on which the dryer and dispenser assembly rests, in turn it has the walls (19) that serve to reduce the drying spaces and obtain the greatest amount of blown air at the feet. This main base (2) has a height of 50 mm to 150 mm, which is enough space for your feet to enter.

The drying base (3) has two sections of fabrics, these are fastened through velcro so that they can be washed if necessary. The spongy fabric (22) helps to dose the talc on the feet in the lower parts of these and the other section is made of compact fabric (23) to absorb the excess water that was on the feet before drying.

The appliance can be manually operated by the manual switch with its 3 positions, off position (55), drying position (56) and dosing position (57), it can also be automatically when actuated with a sensor (68) which triggers a predetermined drying and dosing time. Drying and dosing times can be regulated either manually with the regulating switches or remotely with a mobile app that regulates more precisely. The temperature switch (58) has 3 types of temperatures, ambient, 20° to 35° Celsius and 35° to 60° Celsius. The air power switch (59) regulates the drying power which varies from 500 watts to 5,000 watts which can give air speeds of 1 to 200 km/h. The third drying time switch (60) regulates the amount of time to dry the feet. The fourth dosing time switch (61) regulates the amount of talc to be dosed, which has a time of 1 to 20 seconds, which is enough to put talc on each foot.

This can also incorporate a video camera (67) so that the person can see the feet well in case of mobility problems.

In case the device is for use of 2 feet at the same time, it has an air diverter (54) that separates the air in 2 directions and thus prevents the air from going to places where the feet are not.

The talc dispenser (9) has an average length of 100 mm to 120 mm and for 2 feet from 200 mm to 240 mm.

What is claimed is:

1. An apparatus for measuring talc and drying feet for domestic use, to prevent the formation of fungi due to humidity, comprising:
   a dryer having an electric drying motor (7) and an electric heating elements (8);
   a talc dosing system (9) having a main structure (31);
   a base (30); a plate (33), a cam shaft (35), a spring (34), an electric motor (10), a toothed structure (32);
   a motor base (52);
   a column (66);
   an inlet duct (5);
   an outlet duct (6);
   a main base (2);
   a drying base (3);
   a container (11);
   a cover (4); an air diverter (54);
   a manual command;
   an automatic command having parameter modification switches;
   a sensor (67); and
   a video camera (68), wherein the video camera (68) is connected through a cell phone application in which an image of the feet is displayed and all the parameters of the device are adjusted, wherein said talc dispenser (9) works through an electric motor (10) that rotates a cam shaft (35) has an ovoid shape (45) with its major diameter of 9.16 mm and its minor diameter of 2.94 mm; this differential of measurements in conjunction with the spring (34) causes the plate (33) to have a rectilinear movement to a surface of the cam shaft (35) in constant cycles that ends when the electric motor (10) stops operating; the plate (33) moves through a rail (39); where the electric motor (10) rotates from 100 rpm to 400 rpm and is fed by a current of the home, and wherein at one end it has a male that fits with the grooved female section (47) of the cam shaft (35), wherein said plate (33) has at one of its ends a rectangular section (49) that is pushed by the cam shaft (35), its other end a rectangular flange (51) is pushed by the spring (34), to the 4.5 mm dosing holes (42), in rectangular holes (43) the toothed structure (32) is placed; an opening (50) is where a fastening screw of the main structure (31) passes to the base (30) and where the toothed structure (32) has 2 levels of teeth interspersed with a structure that is as less dense as possible to that the talcum does not stick to it and let it pass; the teeth of an upper level help to lower the talc from the container (11) to the talc dispenser (9) through a rectangular opening (27); the lower teeth help the talc to pass through the frame holes (36) and metering holes (42); its movement is the same as that of the plate (33) which is anchored to the rectangular holes (43) and passes through the slits of the structure (44).

2. The talc and foot drying apparatus for domestic use according to claim 1, wherein said electric drying motor (7) sucks the air through slits (14), circulating through the inlet duct (5) wherein the circulated air is driven through electrical resistances (8) in the output duct (6) working with a power of 500 to 5000 watts to regulate an air speed from 1 to 200 km/h, the air is propelled through 6 to 7 blades; the air that passes through the electrical resistances (8) heats the circulating air from room temperature to 60° Celsius; wherein the talc and foot drying apparatus works with household current.

3. The talc and foot drying apparatus for domestic use according to claim 1, wherein said drying base (3) diverts a part of the air blown to a bottom of the feet through a concave section (twenty-one); 2 sections of fabrics fastened by velcro, a fluffy fabric (22) to help the dosage between the toes and bottom of the feet, wherein the compact fabric (23) removes excess water from the feet; and wherein the main base (2) has support shims (20) that support the dryer and dispenser assembly; wherein the main base having walls (19) that reduce the spaces to obtain better performance of drying the feet.

4. The talc and foot drying apparatus for domestic use according to claim 1, wherein said container (11) is located between the outlet duct (6), the casing (1) and the base (30); they are joined through the walls of a casing (13) that mate with the mating walls (16); it stores from 500 grams to 5000 grams.

5. The apparatus for measuring talc and drying feet for domestic use according to claim 1, wherein the cover serves as a funnel to put the talc in the container (11); it is fixed through holes in the cover (24) to the fixing holes in the housing (15); it has a tab (26) to open and close it; It has protrusions (25) that squeeze the casing (1) to keep it closed.

6. The talc and foot drying apparatus for domestic use according to claim 1, wherein said base (30) has a rectangular opening (27) that allows the talc to pass into the talc dispenser (9).

7. The talc and foot drying apparatus for domestic use according to claim 1, wherein a difference in measurements of the frame holes measuring 6 mm, and the dosing holes (42) measuring 4.5 mm, they create the right dosage for each cycle of the plate (33); time is user-driven or automatically.

8. The apparatus for measuring talc and drying feet for domestic use according to claim 1, wherein said main structure (31) functions as a rail (39) for the plate (33); in the space (41) the spring (34) is placed and its hole serves to pass a screw towards the fixing holes (37) with the holes in the base (28), which serves to fix the talc dispenser (9) to the base (30); one of its ends is the closed support (38) and an open support (40) that serve to position the cam shaft (35) on its shaft (46) so that it can rotate; and wherein the open support (40) of the main structure (31) is fixed with the base of the motor (52) through the holes of the base of the motor (53) with connection holes (48).

9. The apparatus for dosing talc and drying feet for domestic use according to claim 8, wherein said apparatus comprises three modes of operation; the first is through a manual switch, which has 3 positions, an off position (55), a drying position (56) and a dosing position (57); in this only the temperature and power parameters of the dryer are modified; the second is automatic actuation through a sensor (67) which activates the drying time and dosing, the parameters are modified manually with the regulation switches, temperature (58), air power (59), time of drying (60) and the dosing time switch (61); the third is remotely through a mobile application, which regulates all the parameters more precisely.

10. The talc dosing and foot drying apparatus for domestic use according to claim 9, wherein said temperature switch (58) regulates 3 temperature ranges: a) ambient temperature; b) from 20° to 35° Celsius; c) 35° to 60° Celsius; the air power switch (59) regulates a drying power ranging from 500 watts to 5000 watts, varying its speed from 1 km/h to 200 km/h; drying time switch (60) regulates an amount of time to dry, ranging from 10 seconds to 1000 seconds; dosing time switch (61) regulates a dosing time, ranging from 1 second to 60 seconds; wherein it comprises an automatic command that works through a sensor (67) that causes the dryer to be operated for a certain time and then generates the dosage.

11. The talc dosing and foot drying apparatus for domestic use according to claim 1, wherein said casing (1) is supported through the joint holes (12) and holes of the column (62); the column (66) supports the electric heater (8) and the electric drying motor (7) through the support of the duct (17) with support of the column (63); they are screwed through the fixing holes (18) and the fixing holes of the column (64); the outlet duct (6) is fixed to a column of the apparatus through lower holes of the duct (29) with the lower holes of the column (65).

12. The apparatus for measuring talc and drying feet for domestic use according to claim 1, wherein a height of the main base (2) is from 50 mm to 150 mm, which gives a necessary height for optimal drying and dosing.

13. A method of a talc dispenser and foot dryer according to claim 1, characterized by that it comprises: a dryer with its electric drying motor (7) and electric resistances (8); a talc dosing system (9) with its main structure (31); base (30); plate (33), cam shaft (35), spring (34), electric motor (10), toothed structure (32); motor base (52); a column (66); inlet duct (5); outlet duct (6); a main base (2); a drying base (3); a container (11); a cover (4); air diverter (54); a manual command; automatic command; parameter modification switches; sensor (67); a video camera (68); where the base (30) has a rectangular opening (27) that gives way to the talc towards the talc dosing system.

14. The method of a talcum dispenser and dryer for feet according to claim 13, wherein two feet will have an air diverter (54) that will divide the air in two different ways to prevent it from going to a section that the feet are not found; the talc dosing system has an average length of 100 to 120 mm for 1 foot, and for 2 feet from 200 mm to 240 mm; because the container (11) is located between the outlet duct (6), the casing (1) and the base (30); they are joined through walls of the casing (13) that mate with mating walls (16); it stores from 500 grams to 5000 grams.

15. The method of a talc dispenser and foot dryer according to claim 14, wherein said lid (4) serves as a funnel to put the talc in the container (11); it is fixed through holes in the cover (24) to the fixing holes in the housing (15); it has a tab (26) to open and close it; it has protrusions (25) that squeeze the casing (1) to keep it closed.

16. The method of a talcum dispenser and foot dryer according to claim 13, wherein said plate (33) has at one of its ends a rectangular section (49) that is pushed by the cam shaft (35), its other end a rectangular flange (51) is pushed by the spring (34), to dosing holes (42) of 4.5 mm., in rectangular holes (43) the toothed structure (32) is placed; the opening (50) is where a fastening screw from the main structure (31) to the base (30) passes.

17. The method of a talc dispenser and foot dryer according to claim 13, wherein said toothed structure (32) has 2 levels of teeth interspersed with a structure that is as less dense as possible so that the talc does not stick to this one and let this one pass; the teeth of the upper level help to lower the talc from the container (11) to the talc dispenser (9) through the rectangular opening (27); the lower teeth help the talc to pass through frame holes (36) and metering holes (42); its movement is the same as that of the plate (33) which is anchored to rectangular holes (43) and passes through slits of the structure (44).

18. The method of a talc dispenser and foot dryer according to claim 13, wherein a difference in measurements of the holes in the structure (36) that measure 6 mm, and dosing holes (42) that they measure 4.5 mm, they create the right dosage for each cycle of the plate (33); time is user-driven or automatically.

19. The method of a talc dispenser and foot dryer according to claim 13, wherein said main structure (31) functions as a rail (39) for the plate (33); in a space (41) the spring (34) is placed and its hole serves to pass a screw towards fixing holes (37) with holes in the base (28), which serves to fix the talc dispenser (9) to the base (30); one of its ends is a closed support (38) and the open support (40) that serve to place the cam shaft (35) on its axis (46) so that it can rotate, where the open support (40) of the main structure (31) is fixed with the motor base (52) through the holes in the motor base (53) with attachment holes (48).

20. The method of a talc dispenser and foot dryer according to claim 19, wherein said apparatus comprises three ways of operation; the first is through a manual switch, which has 3 positions, an off position (55), a drying position (56) and a dosing position (57); in this only a temperature and power parameters of the dryer can be modified; the second is automatic actuation through a sensor (67) which activates the drying time and dosing, the parameters can be modified manually with the regulation switches, temperature (58), air power (59), time of drying (60) and the dosing time switch (61); the third is remotely through a mobile application, which can regulate all the parameters more precisely.

\* \* \* \* \*